United States Patent
Yokotsuka et al.

[15] 3,674,644
[45] July 4, 1972

[54] PRODUCTION OF NOVEL ACIDSTABLE AND THERMOSTABLE PROTEASE

[72] Inventors: Tamotsu Yokotsuka, Nagareyama-shi; Hikotaka Hashimoto, Noda-shi; Takashi Iwaasa, Noda-shi, all of Japan

[73] Assignee: Kikkoman Shoyu Co., Ltd., Noda-shi, Japan

[22] Filed: Dec. 12, 1969

[21] Appl. No.: 884,740

[30] Foreign Application Priority Data

Dec. 26, 1968 Japan..................................43/95002
Oct. 7, 1969 Japan..................................44/79624

[52] U.S. Cl.................................................195/62, 195/65
[51] Int. Cl. .....................................................C12d 13/10
[58] Field of Search........................................195/62, 65, 66

[56] References Cited

UNITED STATES PATENTS

| | | | |
|---|---|---|---|
| 3,492,204 | 1/1970 | Koaze et al. | 195/66 |
| 3,510,402 | 5/1970 | Marshall | 195/62 |
| 3,288,683 | 11/1966 | Tanaka et al. | 195/66 |
| 3,361,643 | 2/1968 | Fukushima et al. | 195/66 |
| 2,888,385 | 5/1959 | Grandel | 195/67 |

OTHER PUBLICATIONS

Matsumura et al., Chemical Abstracts Vol. 61, 4714b (1964).

*Primary Examiner*—Lionel M. Shapiro
*Attorney*—Cushman, Darby & Cushman

[57] ABSTRACT

New acidstable and thermostable protease which is active at pH 1.5–6.5; an optimum pH being 2.0–3.0; an optimum temperature being 60° C. at pH 2.5, 75° C. at 3.5 and 75°–80° C. at 4.5.

The protease has a strong liquefaction power and makes free a very small amount of amino acids, e.g., amino state N: total N is less than 18, when a substrate of defatted soybean is decomposed.

The protease is useful for the food industry, fermentation industry and animal feed industry. The protease is produced by culturing *Penicillium duponti* ATCC 20186 in a solid or liquid medium at a temperature of, preferably, 40°–50° C. and at a pH of 4.0–7.0.

19 Claims, No Drawings

PRODUCTION OF NOVEL ACIDSTABLE AND THERMOSTABLE PROTEASE

BACKGROUND OF THE INVENTION

1. Field of the Invention

The present invention relates to a novel thermostable and acid-stable protease and a process for producing the same.

2. Description of the Prior Art

Heretofore, as acid proteases have been known pepsin, rennin, cathepsin, gastricsin and protozoa obtained chiefly from gastric juice, liver, kidney, etc. of animals, and pinguinain, tabernamontanain, actinidin, euphorbain, lotus protease, carboxy-peptidase C, etc. obtained from fruit juice, albumens, fruit peel, etc. of plants. The following micro-organisms can produce such proteases as mentioned above:

1. Genus Aspergillus: *Aspergillus oryzae*, *Aspergillus saitoi*, etc.,
2. Genus Penicillium: *Penicillium purpurogenum*, *Penicillium rubrum*, *Penicillium luteum*, *Penicillium chrysogenum*, *Penicillium expansum*, etc.,
3. Genus Rhizopus: *Rhizopus javanicus*, *Rhizopus tonkinensis*, *Rhizopus Chinensis*, *Rhizopus formosensis*, etc.,
4. Genus Mucor: *Mucor hiemalis*, *Mucor pusillus*, etc.,
5. Other mold and Basidiomycetes: *Paecilomyces varioti*, *Trametes sanguinea*, *Lloydella subpileata*, etc.,
6. Yeast and bacteria: *Saccharomyces cerevisiae*, *Lactobacillus casei*, *Chrostridium acetobutylicum*, etc.

However, any of these proteases has not such a thermostable property as seen in the thermostable neutral or alkaline proteases produced by actinomycetes, bacteria, etc. There has been no acid protease having an especially remarkable thermostable property produced by genus Penicillium. Moreover, it has not been reported yet that the so-called thermophilic molds which show a significant growth activity even at a high temperature of 55° C. or more especially microorganisms belonging to genus Penicillium can produce a large amount of thermostable and acidstable protease.

The acid-stable and thermostable protease obtained according to the present invention can decompose protein at a high temperature in a short time at an acidic side. Accordingly, it is utilizable in such a field there is a danger of spoiling flavor or decomposing the component when the decomposition is conducted in an alkaline side, and no putrefaction is observed during the decomposition.

SUMMARY OF THE INVENTION

Demand for a thermostable and acidstable protease has been increased in the field of food industry, fermentation industry, animal feed industry, drug industry, etc., but its utilization has not been satisfactory. There has been none of such an example that micro-organisms have been utilized as main production source to produce a large amount of protease in an industrial scale. As the result of detecting micro-organisms widely in the fields, the present inventors have succeeded in isolating from a compost a micro-organisms which belongs to a thermophillic mold and can vigorously grow at a high temperature of 50° C. or more. That is, it has been found that the microorganism is new strain belonging to *Penicillium duponti*. It has been found that an extremely large amount of protease having a strong thermostable and acidstable property can be accumulated in a culture medium when said strain is cultured in the culture medium at a high temperature of 37° C. or more.

According to the present invention a thermostable and acid-stable protease is formed and accumulated in a culture medium by culturing the strain, *Penicillium duponti* ATCC 20186 in the culture medium and then is recovered from the culture medium or the product obtained by treating the culture medium.

A thermostable and acid-stable protease of the present invention shows an enzymatic activity at pH 1.5–6.5, and its optimum pH is at a pH of 2.0–3.0. The present protease can work in a wide range of from room temperature to 90° C. The optimum temperature is 60° C. at a pH of 2.5, 75° C. at a pH of 3.5 and 75°–80° C. at a pH of 4.5. The optimum temperature is higher than that of any one of the heretofore known acid proteases. Moreover, this enzyme is stable at a pH of 2.0–6.5 at 30° C. and at a pH of 3.5–6.0 at a temperature as high as 60° C. However, it is unstable at an alkaline side, irrespective of a temperature. In case of a pH of 4.5, the present protease loses its activity by 20–30 percent, when heat treated at 75° C. for 10 minutes, by 80 percent when heat treated at 80° C for 10 minutes and almost completely, when heat treated at 90° for 10 minutes. When there is a substrate or other metallic salts capable of increasing the stability of the present protease, the stability of the present protease for the pH and temperature can be more increased than when there is no substrate at all. The present protease has a wide substrate peculiarity and acts upon such vegetable proteins as soybean protein, gluten, etc. and such animal proteins as milk casein, gelatine, hemoglobin, etc. and can make free the peptides and amino acids.

The most significant characteristics of the present protease are a strong liquefaction power of protein and less liberation of amino acids. It has been found that in case of defatted soybean protein, a ratio of amino-state N: total N in the decomposed liquor, represented by amino-state $N/Total\ N \times 100$, is less than 16.0, though somewhat different depending upon the conditions of decomposition, and the ratio is less than 13.0 at a pH of 3.5 and 60° C., and a pH of 3.5 and 65° C. (vide: Table 1). Said ratio never exceeds 18 even if the decomposing time is prolonged.

Microbiological properties of *Penicillium duponti* ATCC 20186 are given below:

Growth of colonies when cultured in a Koji extract agar medium (Ballg. 10°, pH 6.0):

28° C.: Slight growth after culturing for 15–18 days.
30° C.: No growth in 2 days; 6 mm in 3 days; 10 mm in 4 days.
37° C.: 12 mm in 2 days; 18 mm in 3 days; 34 mm in 4 days.
40° C.: 36 mm in 2 days; 59–63 mm in 3 days; 85 mm in 4 days.
50° C.: 43 mm in 2 days; 68–70 mm in 3 days; 85 mm or more in 4 days.
55° C.: 33 mm in 2 days; 51–52 mm in 3 days; 70 mm in 4 days.
59° C.: Growable
60° C.: Impossible to grow It has been found that the growth temperature range for *Penicillium duponti* is 28°–59° C. and the optimum temperature is 45°–50° C.

The growth takes place very rapidly as shown above, and the colonies have radial and annular wrinckles. The plexus of the micro-organism is floccose because an aerial mycelium grows at initial stage (2–3 days) and becomes velvety after about 4 days. The inserting part of conidias is yellow and mealy. The insertion of spores is extremely strong. No exudated substances are recognized. The color tone of the colony surface varies with culturing temperature and time and culture medium.

40° C.: Yellowish grey-white (in 3 days culture) [3Y–18 according to "Color Standard Presentation Method (1964) compiled by Nihon Shikisai Kenkyuzyo (Japan Color Research Institute)]
50°–55° C.: Pale yellowish brown in 3 days culture (1rY–19 –2rY–19)

Color tone of the back side of the medium:
40° C.: Yellowish green-brown in 3 days culture (2rY–18),
50° C.: Light reddish brown in 3 days culture (4YO–17 –5YO–17),
55° C.: Yellowish orange in 3 days (4YO–18–5YO–18).

No coloring matters outside the cell bodies are recognized.

The present micro-organism has penicillus characteristic of genus Penicillium, and is monoverticillata or biverticillata.

The conidiophore grows almost perpendicularly from the basal hypha, and swells at the top: $2-4\ \mu \times 30-60\ \mu$.

The sterigmata is lanceolate and spreads out without mutually close contact and the size is $2-3\ \mu \times 5-11\ \mu$. The conidias take insertion in a long-stretched and xaugled state from the top of the sterigmata and one of them is ellipstical or oval, and flat and smooth. The size is 1.5–2.0 μ × 3.0–4.0 μ. Yellow or greyish brown perithecias are formed by culturing for a prolonged period of time below the optimum temperature (about 37° C.). Formation of an ascus consisting of eight ascospores is recognized. The ascospore is nearly spherical and has a size of 2.5–3.0 μ × 2.0–3.5 μ. The growth is extremely weak in a Czapek-Dox agar medium and white hypha grows slightly. Perithecia is found when it is aged. However insertion of conidia is scarcely recognized.

The above-mentioned results have been examined in the light of Raper and Thom. "Manual of the Penicillia (1949.)" Donald G. Cooney and Ralph Emerson: "Thermophilic Fungi"; "Atlas of Micro-organism: The Penicillia" published by Kanehara Shuppan K.K., Japan, and as a result, it has been found that the present micro-organism is new strain belonging to Penicillium duponti ATCC No. 20186. The thermostable and acid-stable protease of the present invention can be produced by either solid culture or liquid culture.

As explained above, the present strain grows at a high temperature, and does not grow at a temperature of less than 28° C. The upper limit growth temperature reaches 59° C. That is, the optimum growth temperature of the present strain is 45° to 50° C. The optimum temperature for producing the acidstable and thermostable protease by using the present strain is 40°–55 C, preferably 40°–50° C.

The pH for the growth of the present strain is in a range of 2.0 to 10.0, preferably 4.0 to 7.0. In the medium for culturing the present strain, the assimilable carbon source, nitrogen source and other components necessary for the growth of the strain can be contained.

The culture medium contains an assimilable carbon source, nitrogen source and other components necessary for the growth of the micro-organism.

In conducting the solid culture, a culture medium is prepared by adding about 60 percent of water to cereals such as properly pulverized wheat, barley, rice, and corn or wheat bran or wheat flour after the sterilization under pressure. In this case, inorganic nitrogen sources such as ammonium nitrate, ammonium chloride, ammonium sulfate, and ammonium phosphate, are added to water in the amount of 5 percent or less.

In carrying out the liquid culture, such a culture medium is used, wherein such carbon sources as, for example, wheat, wheat bran, barley, rice bran, starch, dextrain, sucrose, lactose, maltose, dextrose, waste molasses, glycerin, paraffin, and the like, such nitrogen sources as, for example, inorganic or organic nitrogen-containing substances such as ammonium salts, cornsteep liquor, peptone, meat extract, soybean powder, cotton seed flour, wheat flour, yeast, chlorella, urea and the like.

Further, the production of the acidstable and thermostable protease can be twice to five times increased by adding 1.0 to 5.0 percent (W/V) of a vegetable oil consisting principally of triglyceride, such as rape oil, soybean oil, rice bran oil, sesame oil, cotton seed oil and peanut oil, to the culture medium.

Furthermore, an effect of increase in production of the acidstable and thermostable protease can be obtained by adding 0.1 to 5.0 percent (W/V) of such a phosphatide as soya lecithin, oilsugar, phosphatidyl inositol and phosphatidyl chloline, or such a fatty acid as erucic acid and oleic acid or their esters to the culture medium, though the effect is not so high as that obtained when the vegetable oil is added to the culture medium. For example, the effects of the vegetable oils, phosphatides, fatty acid and its ester upon the production of the acidstable and thermostable protease using the present strain are given in the following table.

TABLE 1

Influences of additives upon the production of acidstable and thermostable protease

| Additive | Activity | Additive | Activity |
| --- | --- | --- | --- |
| No addition | 100 | Soya lecithine(1.0%) | 191 |
| Rape oil (1.0%) | 241 | Oilsugar(2.0%) | 166 |
| Soybean oil (1.0%) | 225 | Phosphatidyl inositol (1.0%) | 150 |
| Rice oil (1.0%) | 225 | | |
| Sesame oil (1.0%) | 216 | Phosphatidyl chloline (1.0%) | 141 |
| Soy sauce oil (1.0%) | 208 | Erucic acid(0.5%) | 125 |
| | | Ethyl erucate(0.5%) | 133 |

Note: The additive was added to the basal medium containing 3.0 percent of a mixture of wheat bran and wheat flour and 2.0 percent of NH$_4$Cl, and Penicillium duponti ATCC 20186 was cultured in the medium at 43° C for 70 hours.

In Table 2, a relation between the amount of rape oil used as the additive and the production of the present protease is given.

TABLE 2

Relation between amount of rape oil added and production of protease

| Amount of rape oil added | Activity |
| --- | --- |
| 0 % | 100 |
| 1 % | 280 |
| 2 % | 381 |
| 3 % | 467 |
| 4 % | 510 |

Moreover, as for other components necessary for the growth of the microorganism, for example, calcium salts, magnesium salts, potassium salts, zinc salts, copper salts, manganese salts and other metallic salts can be used. Further, vitamins and growth-accelerating factors are preferably added.

When the acid-stable and thermostable protease is produced in a liquid culture medium using the present strain, it is preferable that the initial pH of the culture medium be 2.5 to 4.0 and the final pH of the culture medium at the completion of culturing be 4 to 6.0.

Furthermore, it has been found that the acidstable and thermostable enzyme having the maximum activity can be obtained in a culture medium containing 1.25 percent (W/V) of wheat bran, 1.25 percent (W/V) of rice bran, 0.5 percent (W/V) of wheat flour, 1–5 percent (W/V) of an ammonical nitrogen source and 1–5 percent (W/V) of vegetable oil such as rape oil, soybean oil, etc.

Other culturing conditions are properly adjusted according to various conditions such as culture medium, culturing temperature and the like and determined to obtain the highest yield of the objective enzyme.

For example, in case of the solid culture by wheat bran medium, the initial moisture of the medium is preferably 50–60 percent by weight and the production of the thermostable and acidstable protease significantly decreases in the moisture of below 45 percent, or above 70 percent.

The culturing time is generally 24–120 hours at 35°–55° C., but varies largely with culturing temperatures. Production of the present protease becomes a maximum by conducting cultivation at 37° C. for 120 hours, 40° C. for 96 hours, 45° C. for 72 hours, 50° C. for 48 hours and 52° C. for 24–36 hours. Any micro-organism belonging to genus Aspergillus, genus Penicillium, genus Rhizopus, and genus Mucor or other molds heretofore known as acidprotease-producing microorganisms are impossible to grow at such a high temperature of 40° C. or more, or the production of the acidstable protease extremely decreases.

In case of using *Penicillium duponti* ATCC 20186 according to the present invention, the production of the present protease is not changed even in a high temperature-culture at 40°–52 C. Further there are such remarkable advantages in the present invention that the culturing time can be reduced and the contamination of infectious microbes rarely happens because of the culturing at an elevated temperature.

In carrying out the liquid culture, an appropriate culturing method such as a static culture, shaken culture, agitated culture, aerated culture and the like can be employed. In culturing in a large scale, it is preferable to conduct a submerged culturing. The culture medium having the above-mentioned composition is adjusted to pH 6.0 or less and the culturing is preferably carried out at 35°–50° C. for 12–96 hours under aeration.

The thermostable and acid-stable protease is produced and accumulated in the culture medium by the culture as mentioned above. The thermostable and acid-stable protease is recovered from the resulting cultured medium.

In case of the solid culture, the cultured solid medium is at first extracted with a proper quantity of water, or buffer solution or the like. In the liquid culture, cell bodies are at first filtered off from the cultured liquid medium. The conventional method for isolating and purifying the protease may be used in order to isolate and purify the protease from thus obtained extracted solution or cultured liquid medium (both are protease-containing solutions). For example, the above-mentioned protease-containing solutions are fined according to such a process as centrifugal separation. Subsequently, an inorganic salt such as ammonium sulfate or a water soluble organic solvent such as alcohol or acetone is added to the resulting clear solution so as to precipitate the desired protease and then the deposited protease is recovered by a centrifugal separation. Crude enzyme powders can be obtained by freeze-drying in vacuo the thus obtained enzyme. Or, the present protease can be adsorbed onto an appropriate adsorbent from the clear solution and then desorbed. The crude protease thus isolated may be purified according to such means as gel filtration by Sephadex, chromatography by an ion exchange resin, electrophoresis or the like.

DESCRIPTION OF THE PREFERRED EMBODIMENTS

EXAMPLE 1

1.5 kg of bran was sprinkled with 900 ml. of potable water and sterilized at 120° C. for 45 minutes. *Penicillium duponti* ATCC 21086 was inoculated onto the wet bran and cultured at 40° C. for 4 days. The thus obtained Koji was extracted with 7.5 l of potable water, filtered through cotton cloth and then separated by centrifuge, whereby 6.7 l of an enzyme solution was obtained. The precipitates were separated by adding 13 l of cold alcohol to said solution to effect precipitation, the resulting precipitates were recovered by a centrifugal separation and dried in vacuo whereby 55.0 g of the thermostable and acid-stable protease powders was obtained. The thus obtained powders contained the thermostable and acidstable protease of 300,000 $[PU]^{\text{cas. 275. B}}_{\gamma \text{ tyr.}}$ in one gram of the powders. [It was determined according to Caseins 275 mµ method described in Shiro Akabori: "Koso Kenkyu Ho" (Procedure for Enzyme Study. Vol. 2).] That is, 2.5 ml. of a 0.6 percent milk casein solution at pH 2.5 was added to 0.5 ml. of the enzyme solution and the reaction was conducted at 30° C. for 10 minutes. Subsequently, 2.5 ml. of a mixed solution of acidic buffer solution - trichloroacetic acid (protein-precipitating reagent B) was added to the said solution and then the decomposed products in the filtrate was measured according to a 275 mµ absorption method. One unit of the enzymatic activity is defined by an enzymatic activity to produce non-protein substances showing a 275 mµ - absorption minute, which corresponds to 1 γ of tyrosine, $[PU]^{\text{cas. 275. B}}_{\gamma \text{ tyr.}}$ The results of the soybean digestion tests by the thus obtained protease preparate are shown in Tables 3 and 4. The conditions of the decomposition are that the enzyme was added to a solution containing 10 percent denatured defatted soybean powders so that the activity per ml of the reaction solution may be 200 $[PU]^{\text{cas. 275. B}}_{\gamma \text{ tyr.}}$ and the decomposition was conducted at a predetermined pH and a predetermined temperature. In the tables, T.N., F.N. and U. show total nitrogen percent of the decomposed filtrate solution according to Kjeldahl method, amino-state nitrogen percent of the same according to Formol titration-method and percentage of nitrogen decomposed and eluted from the total nitrogen of the raw material, respectively. The decomposition time was for 10 hours.

TABLE 3

| Decomposition temperature | pH of decomposed solution | T.N. (%) | F.N. (%) | $\frac{F.N.}{T.N.} \times 100$ (%) | U (%) |
|---|---|---|---|---|---|
| 55°C | 2.5 | 0.567 | 0.070 | 12.35 | 67.9 |
|  | 3.5 | 0.553 | 0.063 | 11.39 | 66.2 |
|  | 4.0 | 0.542 | 0.066 | 12.18 | 64.9 |
| 60°C | 2.5 | 0.535 | 0.073 | 13.64 | 64.1 |
|  | 3.5 | 0.577 | 0.066 | 11.44 | 69.1 |
|  | 4.0 | 0.568 | 0.062 | 10.92 | 68.0 |
| 65°C | 2.5 | 0.462 | 0.073 | 15.80 | 55.3 |
|  | 3.5 | 0.581 | 0.075 | 12.91 | 69.6 |
|  | 4.0 | 0.561 | 0.071 | 12.66 | 67.2 |
| 70°C | 2.5 | 0.445 | 0.031 | 6.97 | 53.3 |
|  | 3.5 | 0.549 | 0.077 | 14.03 | 65.8 |
|  | 4.0 | 0.571 | 0.086 | 15.06 | 68.4 |
| 75°C | 3.5 | 0.503 | 0.075 | 14.9 | 60.2 |
|  | 4.0 | 0.542 | 0.073 | 13.47 | 64.9 |
|  | 4.5 | 0.567 | 0.081 | 14.2 | 68.0 |
|  | 5.0 | 0.431 | 0.043 | 10.0 | 51.6 |

TABLE 4

| Decomposition time (hr) | T.N (%) | F.N (%) | $\frac{F.N.}{T.N.} \times 100$ (%) | U (%) |
|---|---|---|---|---|
| 0.25 | 0.213 | 0.013 | 6.10 | 25.5 |
| 0.5 | 0.279 | 0.024 | 8.60 | 23.4 |
| 1 | 0.346 | 0.031 | 8.96 | 41.4 |
| 2 | 0.425 | 0.038 | 8.94 | 50.9 |
| 4 | 0.484 | 0.048 | 9.92 | 58.0 |
| 6 | 0.533 | 0.057 | 10.69 | 63.8 |
| 8 | 0.547 | 0.062 | 11.33 | 65.5 |
| 10 | 0.563 | 0.066 | 11.72 | 67.4 |
| 24 | 0.628 | 0.101 | 16.08 | 75.2 |
| 48 | 0.675 | 0.120 | 17.78 | 80.8 |

It is seen from the result of Table 3 that the decomposition percentage of the soybean decomposition at 70° C. or 75° C. for 10 hours was higher than that of the decomposition at 55° C. The present protease was recognized to be a thermostable and acidstable enzyme.

EXAMPLE 2

Example 1 was repeated, except that the culturing was conducted at 45° C. for 3 days, whereby 50 g. of a thermostable and acid-stable protease was obtained.

EXAMPLE 3

Culturing was conducted in the same manner as in Example 1 except that the culturing was carried out at 50° C. for 2 days, whereby 52 g. of a thermostable and acid-stable protease was obtained.

EXAMPLE 4

Fifty ml. of a liquid medium consisting of 2.0 percent by weight of bran and 0.5 percent by weight of defatted soybean at pH 5.0 was poured into each of 500 ml. shaking flasks and sterilized at 120° C. for 30 minutes. *Penicillium duponti* ATCC 21086 was inoculated onto the medium and cultured at 45° C for 2 days. After the culturing, the cultured liquor was separated by a centrifuge to remove cell bodies and insoluble matters, whereby 400 ml. of an enzyme solution was obtained. Two hundred and twenty g. of ammonium sulfate was added to the enzyme solution and the separated precipitates were recovered by centrifuge. After dialysis and freeze-drying, 6.0 g. of a thermostable and acidstable protease was obtained.

EXAMPLE 5

Twenty l of an aqueous culture medium containing 1.25 percent by weight of wheat bran, 1.25 percent by weight of rice bran, 0.5 percent by weight of wheat flour, 2.0 percent by weight of $NH_4Cl$ and 3.0 percent of rape oil was taken into a 30 l jar fermenter, and after the pH of the medium was adjusted to 4.0, the fermenter was sterilized at 120° C. under pressure for 60 minutes.

*Penicillium duponti* ATCC 20186 was inoculated in the medium and cultured at 45° C. with aeratim for 3 days. Fifteen l of clear enzyme solution was obtained by centrifuge of the cultured medium to remove cell bodies and insoluble matters. Cold ethanol in an amount three times larger than the amount of the enzyme solution was added to the solution under cooling, and 40 g. of crude powders of a thermostable and acidstable protease were obtained by vacuum drying.

The thus obtained powders had a thermostable and acid-stable protease of 320,000 $[PU]^{cas.\ 275.\ B}_{\gamma\ tyr.}$ in 1 g. thereof.

EXAMPLE 6

Culturing was carried out in the same manner as in Example 5, except that 1.0 percent of soya lecithin was contained in the medium in place of the rape oil, whereby 45 g. of the protease was obtained.

EXAMPLE 7

Culturing was effected in the same manner as in Example 5, except that 0.5 percent of erucic acid was contained in the medium in place of the rape oil, whereby 38 g. of the protease was obtained.

We claim:

1. A process for producing an acid-stable and thermostable protease which has a strong liquefaction power, little ability to liberate amino acids, and is active at a pH of 1.5–6.5, the optimum pH being 2.0–3.0, the optimum temperature of the protease being 60° C. at a pH of 2.5, 75° C. at a pH of 3.5 and 75°–80 C. at a pH of 4.5, which comprises culturing *Penicillium duponti* ATCC No. 20186 in a culture medium containing an assimilable carbon source, a nitrogen source and other essential nutrients at a temperature of 28°–59° C. and at a pH of 2.0–10.0 under an aerobic condition.

2. A process according to claim 1 wherein the culturing is conducted in a solid culture medium containing cereals as a base and having an initial moisture of 50–60 percent by volume, at 37° to 50° C. for 120 hours to 24 hours, the time of culturing varying inversely with the temperature.

3. A process according to claim 1 wherein the culturing is conducted in a liquid culture medium at a pH of not over 6.0 and at a temperature of 35°–52° C. for 12–96 hours under aeration.

4. A process according to claim 3 wherein the culture medium contains 1.0 to 5.0 percent (W/V) of vegetable oil.

5. A process according to claim 4 wherein the vegetable oil is at least one member selected from the group consisting of rape oil, soybean oil, rice bran oil, sesame oil, cotton seed oil and peanut oil.

6. A process according to claim 3 wherein the liquid culture medium contains 0.1 to 5.0 percent (W/V) of fatty acid or its ester.

7. A process according to claim 1 wherein the culturing is conducted at a pH of 4.0–7.0 at a temperature of 35°–55° C.

8. A process according to claim 7 wherein the temperature is 40°–52° C.

9. A process according to claim 1 wherein the culture medium is a liquid medium at an initial pH of 2.5–4.0.

10. A process described in claim 1, wherein the culturing is conducted under aeration.

11. A process described in claim 1, wherein the culturing is conducted by static-, shaking- or agitation- culturing method.

12. A process described in claim 1, wherein the aeration is conducted at a pH of 6.0 or less and at a temperature of 35°–55 C for 12–96 hours.

13. A process described in claim 1, wherein the culture medium contains 1.0 to 5.0 percent (W/V) of vegetable oil.

14. A process described in claim 13, wherein the vegetable oil is at least one member selected from the group consisting rape oil, soybean oil, rice bran oil, sesame oil, cotton seed oil and peanut oil.

15. A process described in claim 1, wherein the culture medium contains 0.1 to 5.0 percent (W/V) of phosphatide.

16. A process described in claim 15, wherein the phosphatide is at least one member selected from the group consisting of soya lecithin, oilsugar, phosphatidyl inositol and phosphatidyl choline.

17. A process described in claim 1, wherein the culture medium contains 0.1 to 5.0 percent (W/V) of fatty acid or its ester.

18. A process described in claim 17, wherein the fatty acid is at least one member selected from the group consisting of erucic acid and oleic acid.

19. An acid stable protease made according to claim 1 characterized by being active at a pH of 1.5–6.5, having an optimum pH of 2.0–3.0; an optimum temperature of the protease being 60° C. at a pH of 2.5, 75° C. at a pH of 3.5 and 75°–80° C. at a pH of 4.5, said protease decomposing defatted soybean protein in a culture medium with a strong liquefaction power to a maximum ratio of not over 18 percent of F.N./T.N. × 100 in the decomposed solution, little ability to liberate amino acids, a maximum activity in a liquid medium containing 1.25 percent (W/V) of wheat bran, 1.25 percent of (W/V) rice bran, 0.5 percent (W/V) of wheat flour, 1–5 percent (W/V) of $NH_4Cl$ and 1–5 percent (W/V) of rape oil at an initial pH of 2.5–4.0.

* * * * *